United States Patent [19]

Tilse

[11] E Re. 28,794

[45] Reissued May 4, 1976

[54] BALANCE WHEEL

[75] Inventor: Wilhelm Tilse, Pforzheim-Birkenfeld, Germany

[73] Assignee: Timex Corporation, Waterbury, Conn.

[22] Filed: Apr. 14, 1975

[21] Appl. No.: 568,217

Related U.S. Patent Documents

Reissue of:

[64] Patent No.: 3,851,461
Issued: Dec. 3, 1974
Appl. No.: 317,850
Filed: Dec. 22, 1972

U.S. Applications:

[63] Continuation of Ser. No. 114,277, Feb. 10, 1971, abandoned.

[52] U.S. Cl. ..... 58/107; 29/177; 310/36

[51] Int. Cl.[2] ..... G04C 3/04; G04B 17/00; H02K 33/00

[58] Field of Search ..... 29/177; 58/28 R, 28 A, 58/28 B, 107; 310/36

[56] References Cited

UNITED STATES PATENTS

| | | | |
|---|---|---|---|
| 3,524,118 | 8/1970 | Reich | 58/28 R X |
| 3,626,691 | 12/1971 | Bonsack | 58/107 |
| 3,670,492 | 6/1972 | Takamune | 58/28 A |

*Primary Examiner*—Edith Simmons Jackmon

[57] ABSTRACT

A balance wheel for a horological instrument comprises a substantially annular rim having an enlarged counterweight portion and carrying a body (e.g., coil, magnet). The balance wheel is designed so that the body position is normally offset from the axis of the balance wheel in order that variations in body weight cause a related movement of the balance wheel about the axis. The rotation of the axially supported and initially unpoised balance wheel presents a portion of the counterweight to a stationary tool. The counterweight portion is of a predetermined configuration and the wheel is so designed that the tool removes sufficient material to poise the balance wheel.

5 Claims, 10 Drawing Figures

BALANCE WHEEL

Matter enclosed in heavy brackets [ ] appears in the original patent but forms no part of this reissue specification; matter printed in italics indicates the additions made by reissue.

This is a continuation of application Ser. No. 114,277, filed Feb. 10, 1971 which is now abandoned.

BACKGROUND OF THE INVENTION

The invention relates to horological instruments and more particularly to a new and improved balance wheel and method of poising same.

The prior art includes U.S. Pat. Nos. 2,745,287 and 2,554,033 which are directed to conventional methods for poising balance wheels. These patents appear to be merely of general interest and do not pertain to unsymmetrically shaped balance wheels having a coil mounted thereon. U.S. Pat. No. 3,491,530 to W. Tilse shows a typical balance wheel used in electrical or electronic watches while U.S. Pat. Nos. 3,474,676 and 3,020,682 disclose machines used for poising balance wheels. The foregoing patents are cited as representative of the prior art and are not intended to be all inclusive since other prior art may exist.

SUMMARY OF THE INVENTION

The present invention pertains to a balance wheel carrying a body mounted thereon. The body is mounted unsymmetrically with respect to the axis of rotation of the balance wheel, that is, the center of the body is displaced a predetermined distance from a reference plane through the balance wheel axis. Variations in body weight or wheel design, therefore, cause rotation about the axis of the balance wheel. The rotation of the balance wheel from a poised position stations a particular segment of a counterweight portion of the rim in the nest of a fixed tool. Activation of the tool removes sufficient material to cause the balance wheel to move to a poised or balanced position. The balance wheel of the present invention may thus be readily poised without the use of complex and expensive machines.

Accordingly, it is an object of this invention to provide a new and improved balance wheel.

It is another object of this invention to provide a unique method of poising balance wheels.

A further object of this invention is to provide a new and unobvious balance wheel having an unsymmetrical configuration which facilitates the poising thereof.

A still further object of this invention is to provide an economical and expeditious method for poising balance wheels of an unsymmetrical design.

Other objects and advantages of the present invention may be seen from the following description when viewed in conjunction with the drawings described below, where the embodiment showing a balance wheel carrying a coil is mainly used for explanation.

DETAILED DESCRIPTION

Figure 1:
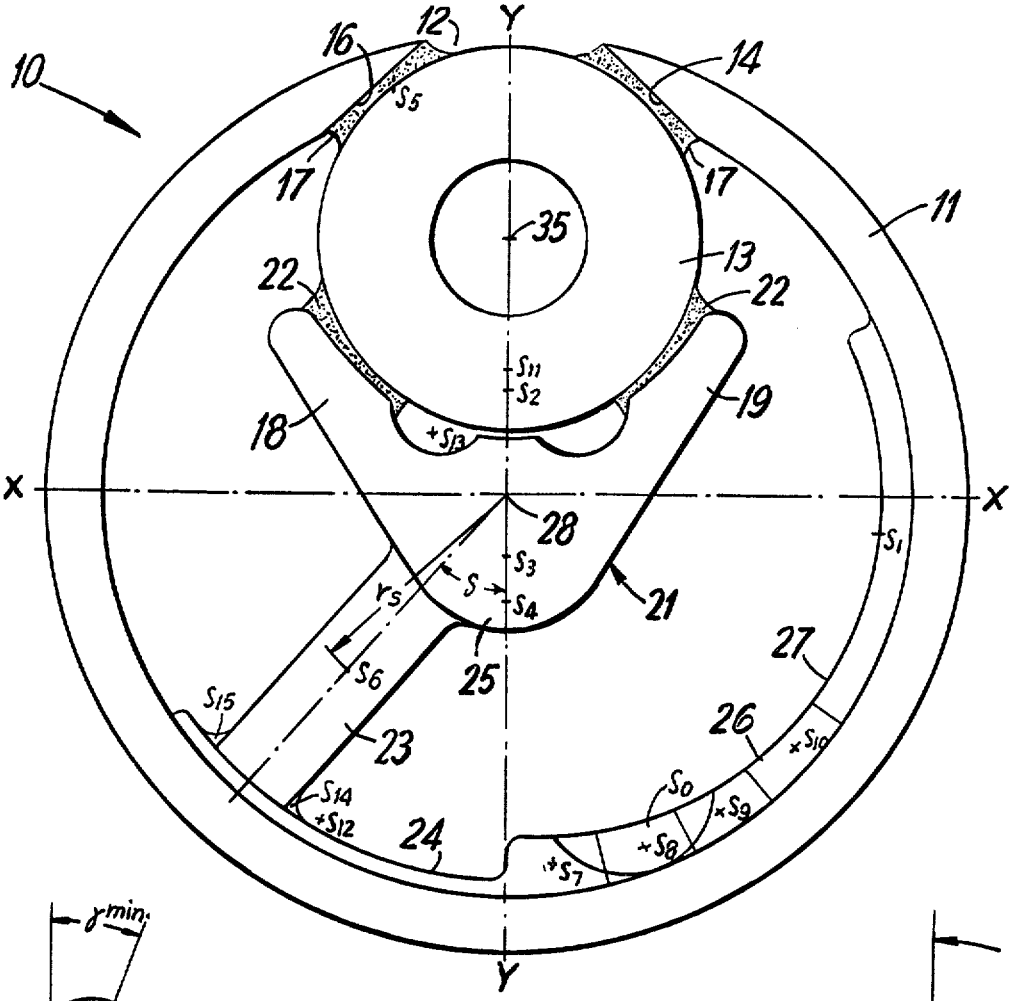
FIG. 1 is a top view of the balance wheel arrangement comprising the present invention.

Referring now to FIG. 1 of the drawings, the balance wheel 10 comprises a substantially annular rim portion 11 having a gap 12 within which part of coil 13 is mounted to the tapered faces 14 and 16 of the rim 11 by means of a suitable adhesive compound 17. The opposite side of the coil 13 is nested between the arms 18 and 19 of yoke 21 and held in position by adhesive 22. The yoke 21 comprises one end of a spoke 23 which extends inwardly from the rim 11 of the balance wheel 10. The rim 11 also includes a slightly enlarged portion 24 extending on both sides of the spoke 23 and an enlarged counterweight portion 26 having an inner curved surface 27 of predetermined configuration.

Figure 10:
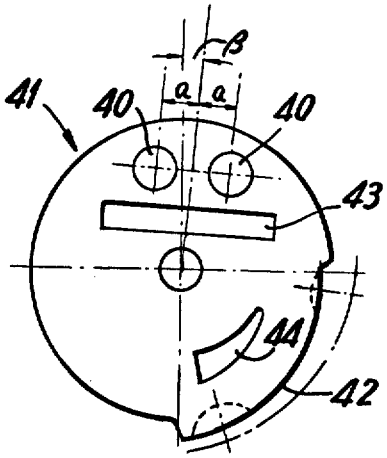
FIG. 10 is a sketch disclosing a balance wheel carrying magnets.

While the invention is depicted thusly in FIG. 1, it is to be understood that the balance wheel 10 could be completely annular, have a sector rim or comprise other variations thereof. Furthermore, the balance wheel 10 may carry magnets as shown in FIG. 10 rather than the coil 13 illustrated in the drawings. In conventional balance wheels, the spoke 23 would generally be joined to the base 25 of the yoke 23 with the center line of the spoke 23 coinciding with the plane Y—Y through the axis of rotation 28 and the center 35 of coil 13.

The balance wheel 10 is designed so that an unbalanced axially supported wheel 10 will rotate a predetermined amount with respect to a fixed tool 29, such as a punch or drill, depending upon variations in coil weight and wheel design. The movement of the balance wheel presents a section of the counterweight 26 to the tool 29. Since the counterweight 26 decreases from a maximum in size and weight at one end to a minimum at the other end, the section removed by the tool 29 is related to the amount of rotation about the axis 28. It is, therefore, possible to employ the same cutter or tool 29 and cutting depth for different balance wheels 10. The counterweight 26 and particularly the crescent shaped surface 27 thereof must be specifically designed to accomplish this effect.

Figure 2:
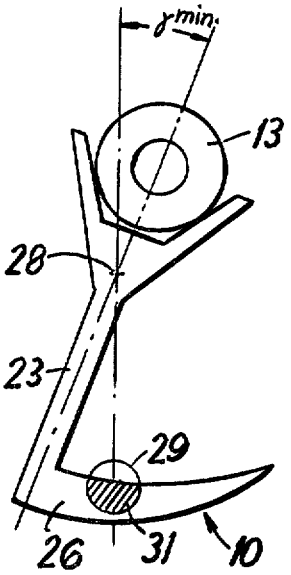
FIGS. 2 and 3 show the position of a balance wheel having respectively a light coil and a heavy coil designed according to this invention.
Figure 3:
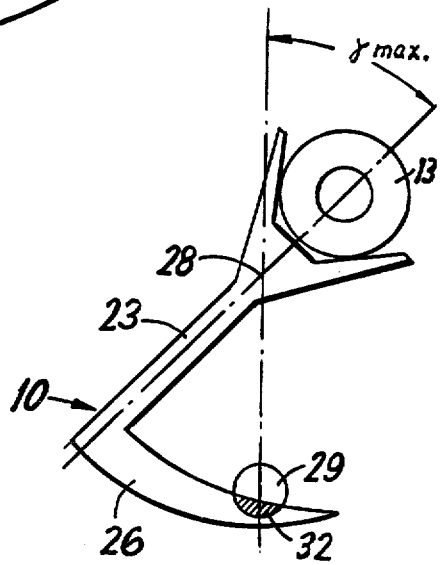

The theory of the invention is shown schematically in FIGS. 2 and 3 which depict two extreme conditions. Under normal manufacturing conditions, a typical coil weight may vary ±5 percent, the conditions represented by FIGS. 2 and 3. FIG. 2 illustrates a light coil 13 of minimum weight which rotates the balance 10 an angle $\gamma$ min about the axis 28 so that a maximum amount of counterweight material 31 is removed by the tool 29. On the other hand, the heavy coil 13 (5 percent over specified weight) rotates the balance 10 a maximum amount, angle $\gamma$ max, with respect to the fixed tool 29 so that a minimum amount of material 32 is removed. The amount of material take-off is controlled by coil position or angle $\gamma$, due to coil weight and by the crescent shape of the counterweight 26.

Figure 4:
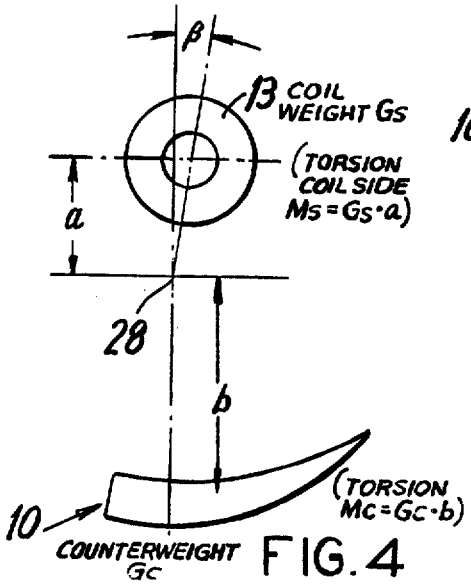
FIG. 4 is a schematic related to the torsion picture of FIG. 5 and the torsion triangle of FIG. 6.
Figure 5:
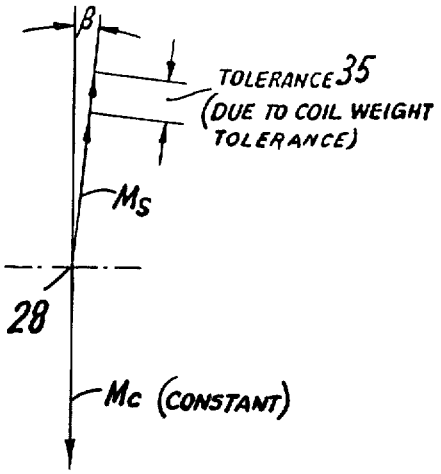
Figure 6:
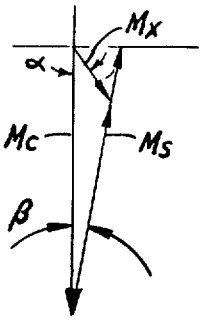

In order to design the balance wheel 10 of FIG. 1 formulas must be developed for the direction of dispoise $\alpha$ and the amount of dispoise $M_r$. Thus, FIG. 4 is a schematic representation of a portion of the balance wheel 10 while FIG. 5 shows the various torsional forces acting on the balance wheel 10 and FIG. 6 represents the force or torsion triangle derived therefrom. The tolerance 35 due chiefly to variations in coil weight is also illustrated in FIG. 5.

The torsional forces about the axis 28 of the balance wheel 10 are as follows:

| | | | |
|---|---|---|---|
| Coilside: | $M_s$ | (torsion) | $=G_s a$ |
| Counterside: | $M_c$ | (torsion) | $=G_c b$ |

where: $G_s$=coil weight; $a$=distance from wheel center
$G_c$=counterweight; $b$=distance from wheel center The direction of dispoise tan $\alpha$ and the amount of dispoise $M_r$ may be determined by applying the sine rule to the torsion triangle of FIG. 6 to obtain the following relationships:

$$\tan \alpha \text{ (direction of dispoise)} = \sin \beta/(M_c/M_s) - \cos \beta \quad (1)$$

$$M_r \text{ (amount of dispoise)} = M_s \sin \beta/\sin \alpha \quad (2)$$

The angle $\beta$ is selected to be as small as possible, say 1° to 10° in view of production tolerances and the distances a and b are known for a particular balance wheel. The maximum and minimum coil weights are substituted in the torsion formulas to obtain the maximum and minimum torsion forces. Both the maximum and minimum angle of dispoise and amount of dispoise are then arrived at by computation using the respective maximum and minimum torsion values.

Figure 8:
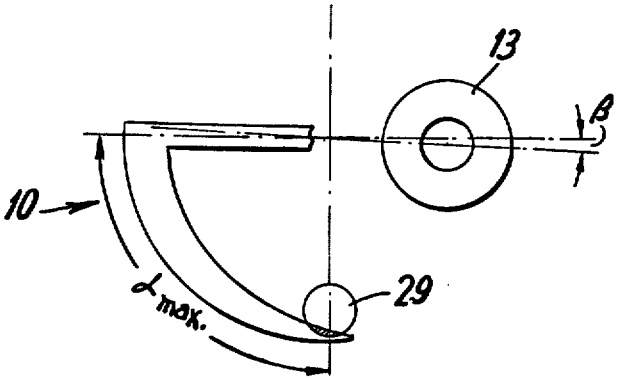
FIGS. 7 and 8 illustrate the conditions of maximum and minimum material removal.
Figure 7:
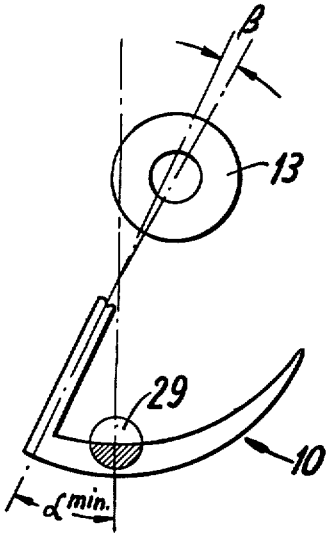

FIG. 7 illustrates, again in schematic fashion, the maximum amount of material to be removed from a typical balance wheel 10 for poising purposes with an angle $\alpha$ min of approximately 25° while FIG. 8 illustrates a condition of minimum dispoise with an angle $\alpha$ max of say 88.5° and angle $\beta$ is selected to be 3°. In designing the balance wheel 10, values of $\alpha$ and $M_r$ between the two extremes should be calculated. Since the tool diameter and cutting depth are known the area of the material to be removed can be determined.

The crescent shaped surface 27 of the wheel 10 is arrived at by calculating the depth of cut h for various values of $M_r$. Since a fixed tool having a diameter of approximately 2 mm may be used, the amount of material take off is determined by the curve of the balance wheel.

Figure 9:
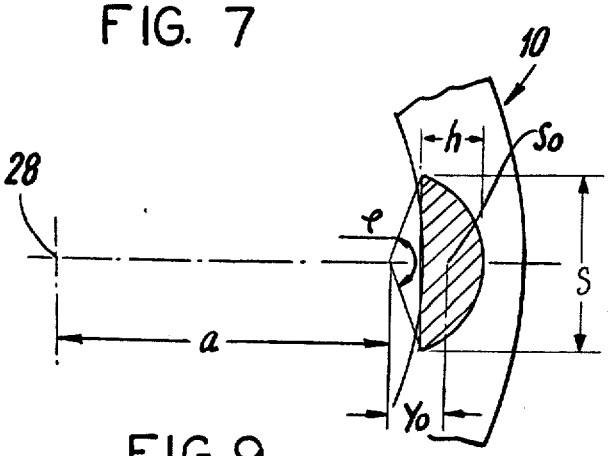
FIG. 9 shows the amount of cut drawing where h is to be computed.

With reference to FIG. 9 the depth of cut h may be computed for various values of $M_r$ as follows:

$$M_r = (a + Y_o)F \cdot d \cdot w \text{ and, } Y_o = S^3/12F$$

where

F = area of sector d = cutting depth of sector w = specific weight of material (density)

$$M_r = d \cdot w \cdot r^2 [a(\phi - \sin\phi)/2 + 2r \sin^3\phi/2/3] \quad (3)$$

Solving for $M_r$ results in the formula above where angle $\phi$ is unknown. Preferably using a computer, $M_r$ (amount of dispoise) is calculated for 1° steps of angle thereby determining the crescent shape 27 angle $\phi$ to height h to be found in common mathematical tables. The chord of the sector is used rather than the actual bow design of the crescent and therefore, the poising method is used sometimes only for rough poising. If there is to be a fine poising operation, the material take off is somewhat less than required in order to ensure that the remaining dispoise for fine poising is still within the area and not on the coil side.

The balance wheel 10 itself is designed by dividing the wheel into small calculable areas where $s_1$, $s_2$, etc., are the centers of gravity, see FIG. 1. The sum of all torsions about the axis 28, M right side, M left side, M above and M below must balance. The wheel 10 will be balanced when the material around $s_0$ is removed since in the illustration a minimum coil weight is used. For calculation purposes, the unknown quantities are area $s_6$ (spoke) and angle $\delta$, the angle between the centerline of the spoke 23 and the X-axis. The unknowns, $s_6$ and $\delta$ are computed by suming the forces as follows:

$$\Sigma M \text{ (below)} = \Sigma M \text{ (above)} \quad (4)$$

$$\Sigma M \text{ (left)} = \Sigma M \text{ (right)} \tan\delta = \Sigma M \text{ (above, below)}/\Sigma M \text{ (right, left)}$$

Having solved the force summations for angle $\delta$ and spoke area $s_6$, the width of the spoke 23 can be computed since the spoke material length and thickness are already known.

The balance wheel 10 and method of manufacture described above simplify the poising operation which now often requires two or three separate drillings merely for rough poising. The present invention also eliminates the costly machines and constant adjustments formerly required in the industry for poising conventionally designed balance wheels. Using known techniques, it is also possible to automatically feed these new-type balance wheels 10 to a poising station at high speed thereby facilitating the mass production process.

It is understood, of course, that the arrangements discussed above are merely illustrative in nature. Numerous other arrangements may be readily devised by those skilled in the art which will embody the principles of the invention and fall within the spirit and scope thereof, for example designs following the condition of formulas (1), (2) and (4) and also formula (3) where a round tool is employed. In another embodiment instead of the coil 13 described above, one or more magnets 40 can be used or any other body mounted on a balance wheel 41 having weight variations. This arrangement is illustrated in FIG. 10.

While the crescent-shaped contour 27 is positioned inside of the rim 26 in the description of coil-carrying balance wheel 10, it can also be located on the outside as shown with magnet-carrying balance wheels 41. Recess 43 and 44 are provided for balance compensation. The maximum and minimum material take offs are also illustrated in dotted lines on the outer crescent surface 42.

I claim:

1. A balance wheel comprising:

a balance body having an axis, a counterweight portion and at least one element subject to weight variations mounted on the other side of said axis from said counterweight portion to cause rotation of the body through an angle when the axis is horizontal and the wheel is not properly poised, said counterweight portion being tapered in a peripheral direction so that said angle is determined by the amount of dispoise, and also varying in distance from said axis in a predetermined manner to facilitate removal of greater predetermined sections of said counterweight portion for correction of correspondingly [ lesser ] *greater* amounts of dispoise.

2. The combination according to claim 1, wherein said wheel comprises:

an outer rim having said counterweight portion extending inwardly therefrom and having a predetermined peripheral contour, the contour of said counterweight portion varying to reflect conditions of dispoise between a maximum value and a minimum value when the balance wheel is supported at its rotational axis and the location of said counterweight portion being determined from corresponding variations in the angle of dispoise between predetermined limits, and a spoke extending inwardly from the rim at a location designed to balance the forces about the axis of the balance wheel and having an area designed to balance said forces, said spoke terminating in a mounting receptacle.

3. The combination according to claim 1, wherein said body is substantially annular and said counterweight portion is located on the outer periphery thereof to facilitate posing of said wheel by removal of a portion of said counterweight, and at least one recess therein for purposes of balance compensation and, said element comprises magnet means mounted in a predetermined position on said body.

4. The combination according to claim 1, wherein said balance body comprises:

a balance body including an outer rim, a spoke extending inwardly from the body and having a mounting yoke at the other end thereof, and wherein said element is mounted to the yoke to cause rotation thereof when the wheel is supported at its rotational axis and is not properly poised.

5. A balance body in accordance with claim 4 wherein:

the outer rim has ring-like configuration which is discontinuous forming a gap between the opposite ends, and the yoke includes a main body portion having a base and two arms extending outwardly from the base, said spoke being joined to the yoke at a predetermined distance from the base.

* * * * *